United States Patent
Wu et al.

(10) Patent No.: US 9,256,810 B2
(45) Date of Patent: Feb. 9, 2016

(54) CARD-LOADING ASSEMBLY FOR ELECTRONIC DEVICE

(71) Applicant: Chiun Mai Communication Systems, Inc., New Taipei (TW)

(72) Inventors: Hung-Chen Wu, New Taipei (TW); Chia-Ju Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 176 days.

(21) Appl. No.: 14/065,611

(22) Filed: Oct. 29, 2013

(65) Prior Publication Data

US 2014/0301049 A1    Oct. 9, 2014

(30) Foreign Application Priority Data

Apr. 9, 2013   (TW) .............................. 102206402 U

(51) Int. Cl.
*H05K 5/00* (2006.01)
*G06K 13/08* (2006.01)

(52) U.S. Cl.
CPC ....................................... *G06K 13/08* (2013.01)

(58) Field of Classification Search
CPC ................................ H05K 5/00; H05K 7/1418
USPC ........................................................ 361/756
See application file for complete search history.

(56) References Cited

U.S. PATENT DOCUMENTS

| | | | | |
|---|---|---|---|---|
| 6,456,501 | B1 * | 9/2002 | Rubenstein et al. | 361/759 |
| 6,717,817 | B2 * | 4/2004 | Liu et al. | 361/737 |
| 6,967,848 | B2 * | 11/2005 | Klatt et al. | 361/759 |
| 7,144,276 | B1 * | 12/2006 | Yang | 439/630 |
| 8,848,376 | B2 * | 9/2014 | Lee | 361/725 |
| 2003/0011974 | A1 * | 1/2003 | Curlee et al. | 361/683 |
| 2008/0316719 | A1 * | 12/2008 | Huang | 361/756 |
| 2010/0165588 | A1 * | 7/2010 | Chan et al. | 361/756 |
| 2011/0267787 | A1 * | 11/2011 | Duan et al. | 361/756 |

* cited by examiner

*Primary Examiner* — Forrest M Phillips

(74) *Attorney, Agent, or Firm* — Novak Druce Connolly Bove + Quigg LLP

(57) ABSTRACT

A card-loading assembly for loading a chip card in an electronic device is provided. The electronic device includes a main body, a circuit board received in the main body, and an entrance defined in the main body. The card-loading assembly includes a positioning frame and a tray. The positioning frame is secured on the circuit board and defines a sliding recess. The tray includes a support portion and an extending portion extending from the support portion. The extending portion is made of dielectric material. The support portion and the extending portion cooperatively define a receiving space for receiving the chip card. The tray is received in the main body through the entrance. The support portion is slidably received in the sliding recess. The extending portion is positioned between the circuit board and the entrance.

15 Claims, 4 Drawing Sheets

CARD-LOADING ASSEMBLY FOR ELECTRONIC DEVICE

BACKGROUND

1. Technical Field

The present disclosure relates to card-loading assemblies for electronic devices.

2. Description of Related Art

Portable electronic devices, such as mobile phones, include a loading assembly for a chip card, such as a subscriber identity module (SIM) card.

A card-loading assembly may include a metal tray attached to a portion of a circuit board of the mobile phone. The chip card is received in the metal tray and is electronically connected to the circuit board through an electric connector. However, because antennas are often mounted close to a periphery of the circuit board and close to the metal tray, the electric connector and the chip card tend to interfere with transmission of the antennas.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The card-loading assembly of the disclosure can effectively seat chip cards such as SIM cards, compact flash cards (CFs), multimedia cards (MMCs), and others. The electronic device of the disclosure, shown in the exemplary embodiment as a mobile phone, can alternatively be a personal digital assistant (PDA), camera, recorder, or other device remaining within the scope of the disclosure.

Figure 1:
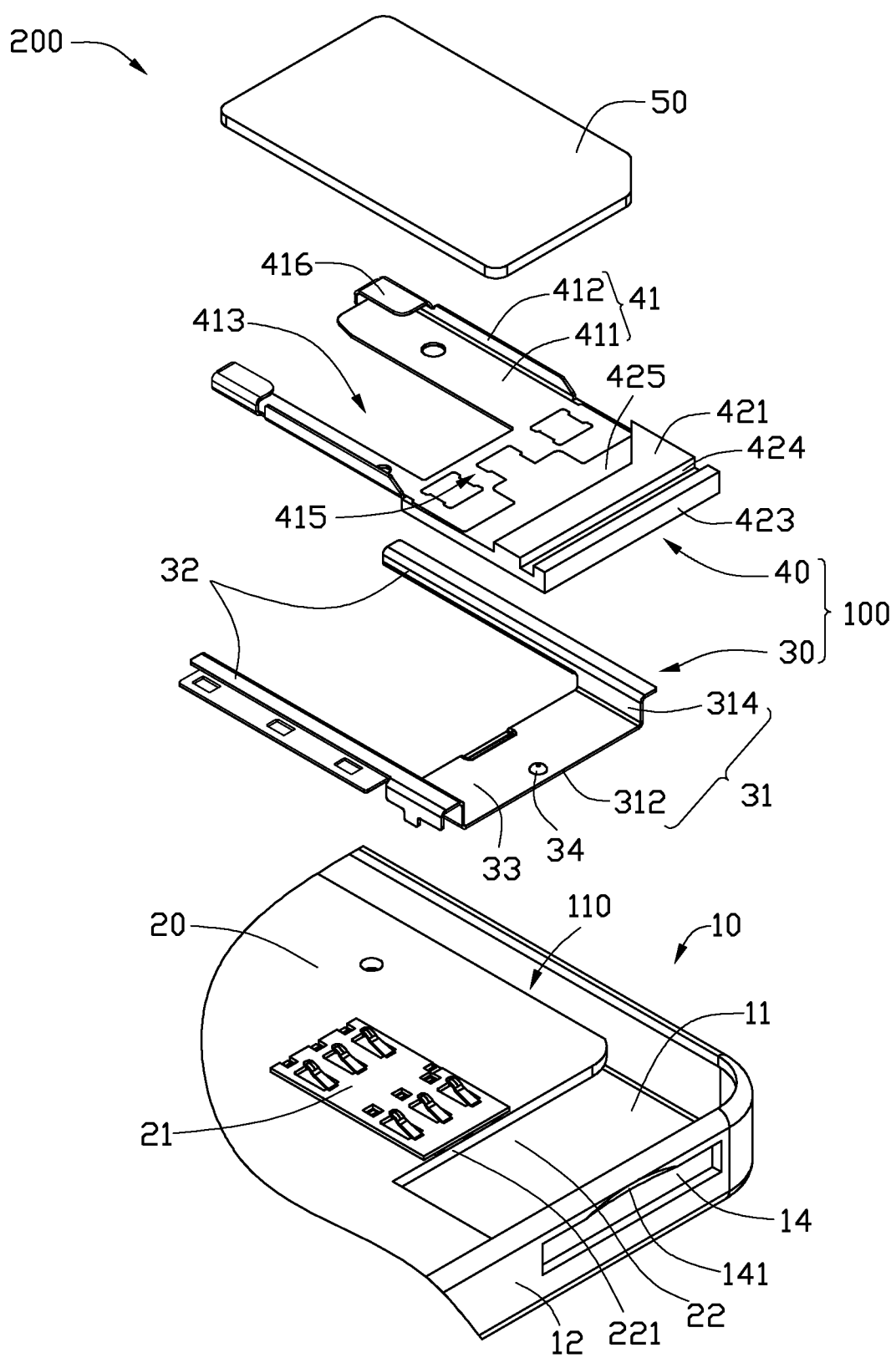
FIG. 1 is a partial exploded, isometric view of an electronic device having a card-loading assembly, in accordance with an exemplary embodiment.

FIG. 1 shows that the electronic device 200 includes a main body 10, a circuit board 20 assembled in the main body 10, a chip card 50, and a card-loading assembly 100. The card-loading assembly 100 includes a positioning frame 30 assembled in the main body 10, and a tray 40 slidably received in the positioning frame 30. The chip card 50 is loaded by the card-loading assembly 200.

The main body 10 can be a housing of the electronic device 200, for example. The main body 10 includes a bottom surface 11 and a peripheral wall 12. The peripheral wall 12 extends substantially perpendicularly from a periphery of the bottom wall 11. The bottom wall 11 and the peripheral wall 12 cooperatively define a mounting space 110. The peripheral wall 12 defines a substantially rectangular entrance 14, which communicates with the mounting space 110. The tray 40 is received in and can be ejected from the main body 10 through the entrance 14. A recess 141 is defined in a side of the entrance 14. The recess 141 facilitates a user's fingertip to pull the tray 40 out from the entrance 14.

The circuit board 20 is mountably received in the mounting space 110. A corner-edge piece of the circuit board 20 is cut off to define a notch 22 and form a notch wall 221. The notch 22 is aligned with the entrance 14. An antenna (not shown) may be assembled to a periphery of the circuit board 20 adjacent to the peripheral wall 12. An electric connector 21 is mounted on the circuit board 20 at a location away from the antenna to prevent the electric connector 21 from interfering with the antenna.

The positioning frame 30 is substantially U-shaped and includes a connecting portion 31 and two guiding arms 32. The connecting portion 31 includes a bottom plate 312 and two side walls 314. The two side walls 314 extend along a same direction substantially perpendicularly from opposite edges of the bottom plate 312, respectively. A latching protrusion 34 protrudes from the bottom plate 312. The two guiding arms 32 extend from edges of the two side walls 314, respectively. The two guiding arms 32 are substantially parallel to the bottom plate 312. The bottom plate 312 and the two guiding arms 32 cooperatively define a sliding recess 33 for receiving the tray 40

Figure 2:
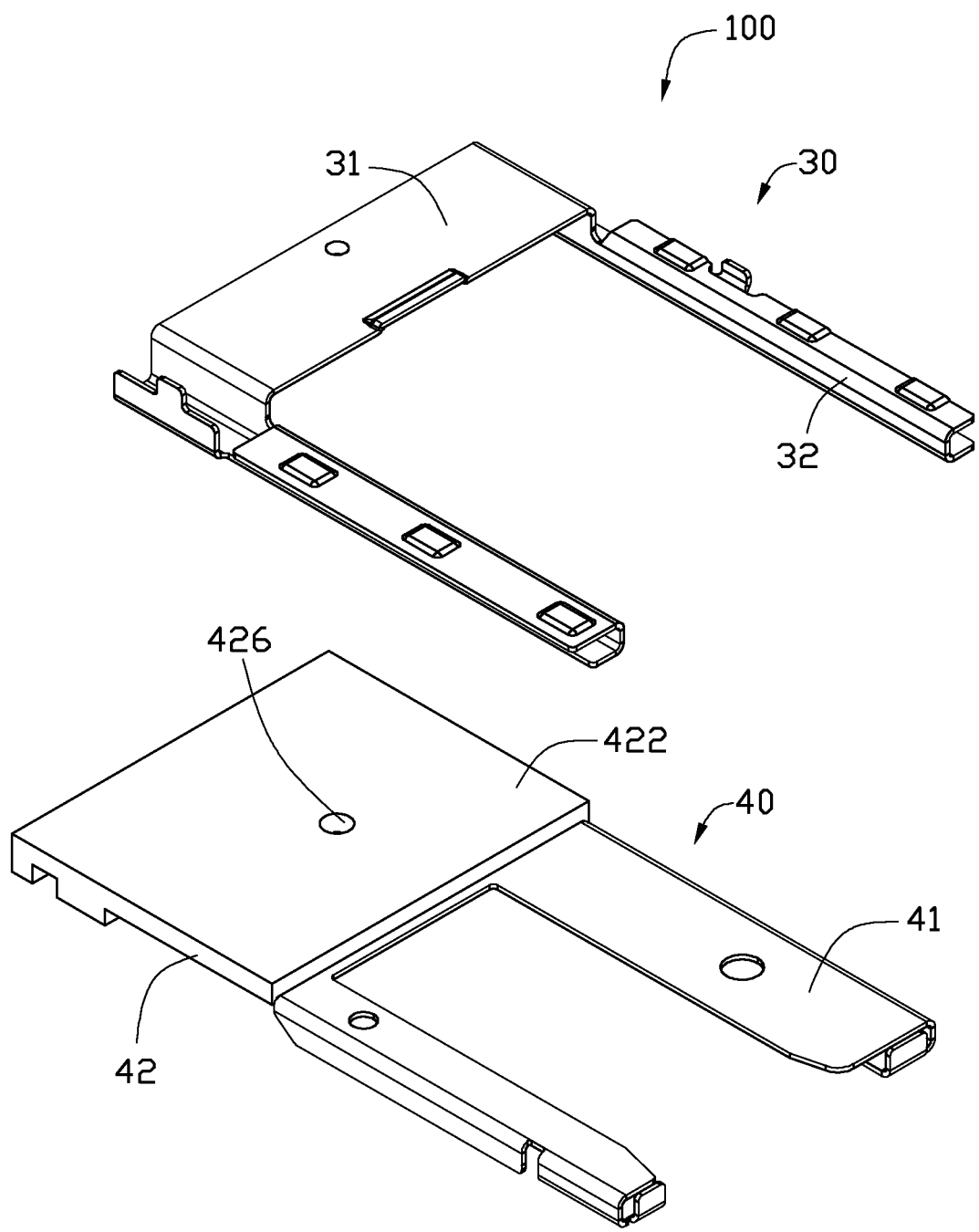
FIG. 2 is an exploded, isometric view of the card-loading assembly of FIG. 1 viewed from another angle.
Figure 3:
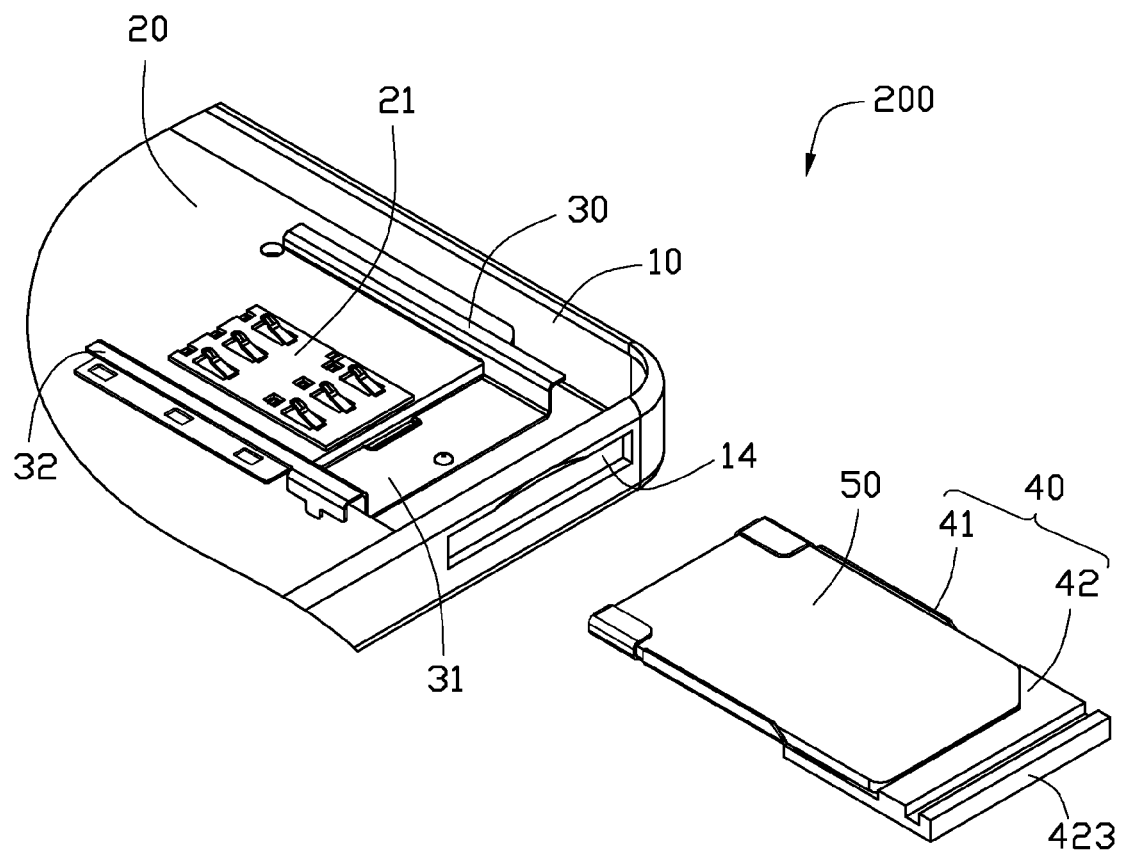
FIG. 3 is a partially disassembled, isometric view of the card-loading assembly of FIG. 1.
Figure 4:
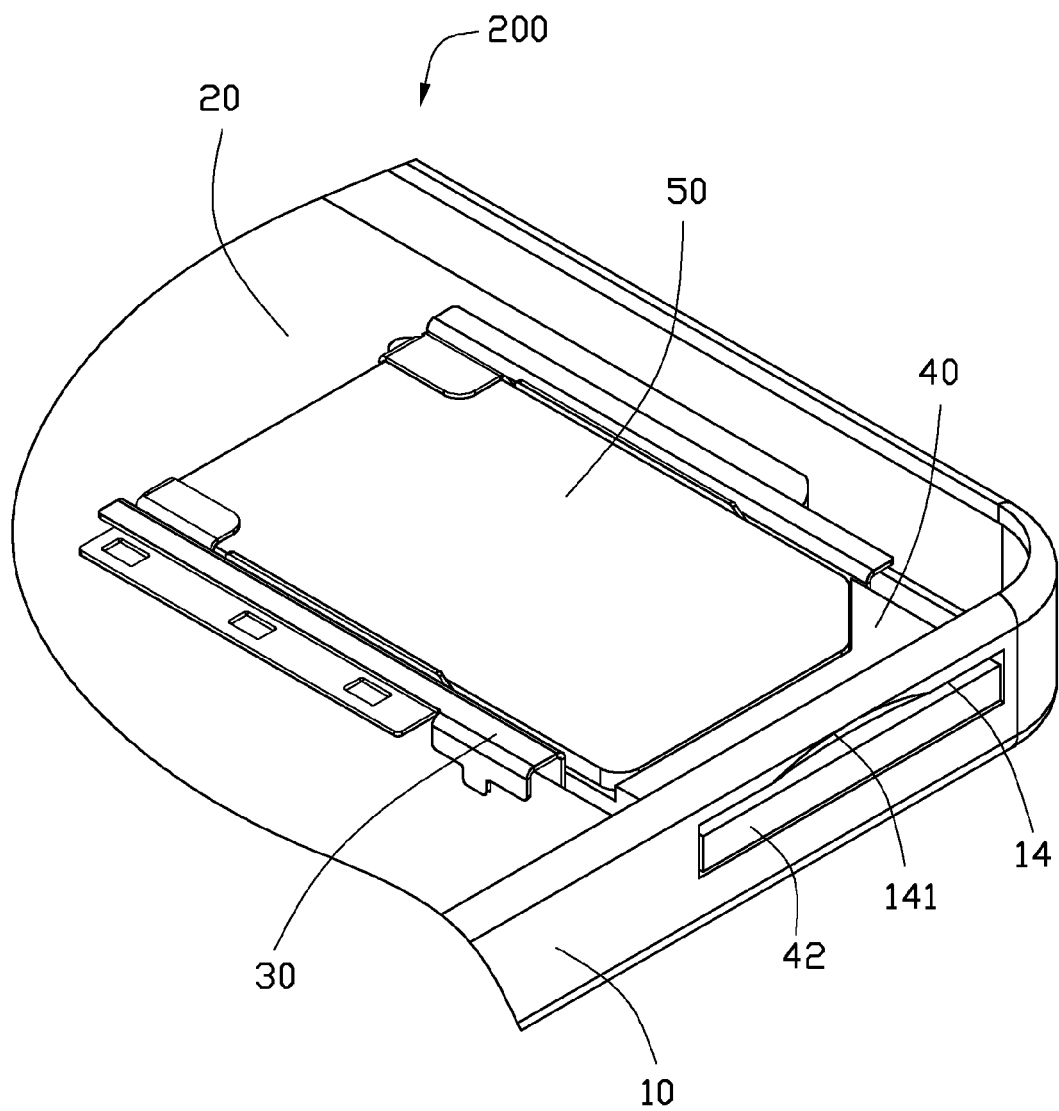
FIG. 4 is an assembled, isometric view of the electronic device of FIG. 1 incorporating the card-loading assembly.

Referring to FIG. 1 and FIG. 2, the tray 40 includes a support portion 41 and an extending portion 42 extending from the support portion 41. The support portion 41 and an end of the extending portion 42 cooperatively define a receiving space 415 for receiving the chip card 50.

The extending portion 42 is made of dielectric material. In this exemplary embodiment, the extending portion 42 is made of plastic. The extending portion 42 is substantially rectangular and includes an upper surface 421, a lower surface 422 opposite to the upper surface 421 and facing the positioning frame 30, and an end surface 423. A strip-shaped groove 424 is defined adjacent to the end surface 423 for facilitating drawing the tray 40 out from the entrance 14. The upper surface 421 defines a recessed portion 425 at an end away from the end surface 423. The lower surface 422 defines a latching recess 426 corresponding to the latching protrusion 34. A distance from the end surface 423 to the recessed portion 425 is substantially equal to a distance between the electric connector 21 and the entrance 14.

In one embodiment, the support portion 41 is made of metal. The support portion 41 and the extending portion 42 are integrally formed together. In the exemplary embodiment, the support portion 41 includes a bottom board 411 and two side boards 412. The bottom board 411 defines an opening 413 for receiving the electric connector 21. An end of the bottom board 411 is connected to a bottom of the recessed portion 425 by insert molding, for example. The two side boards 412 extend substantially perpendicularly from opposite edges of the bottom board 411, respectively. The bottom board 411, the two side boards 412, and the bottom of the recessed portion 425 cooperatively define the receiving space 415. A limiting tab 416 extends from an end of each of the two side boards 412 away from the extending portion 42, to prevent the chip card 50 from sliding out of the receiving space 415.

To assemble the card-loading assembly, referring to FIGS. 1-4, the positioning frame 30 is mounted on the circuit board 20. The two guiding arms 32 are secured on the circuit board 20 by screws or soldering, for example, such that the electric connector 21 is located between the two guiding arms 32, and the bottom plate 312 of the connecting portion 31 is received in the notch 22. An edge of the bottom plate 312 abuts the notch wall 221. The chip card 50 is received in the receiving space 415 of the tray 40. The tray 40 is received in the sliding recess 33 through the entrance 14 and slides in the sliding recess 33 until the latching protrusion 34 is latched in the latching recess 426. As such, the tray 40 with the chip card 50 is secured in the main body 10, such that the end surface 423 is exposed from the entrance 14, and the strip-shaped groove 424 is substantially aligned with the recess 141. Thus, the chip card 50 is electrically connected to the electric connector 21 through the opening 413. The extending portion 42 of the tray 40 is positioned between the circuit board 20 and the entrance 14. The support portion 41 and the chip card 50 are positioned away from the periphery of the circuit board 20 where the antenna is mounted. Since the extending portion 42 is made of dielectric material, and since a distance between the antenna and the support portion 41 of the tray 40 is large enough, the electric connector 21 and the support portion 41 are prevented from interfering with the antenna.

To take out the chip card 50, the recess 141 facilitates the fingertip of a user to hook the strip-shaped groove and remove the tray 40 with the chip card 50 out of the entrance 14. Therefore, it is convenient to remove or change the chip card 50.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

The invention claimed is:

1. A card-loading assembly, comprising:
a positioning frame defining a sliding recess; and
a tray comprising a support portion and an extending portion extending from the support portion, the extending portion made of dielectric material, the support portion and the extending portion cooperatively defining a receiving space for receiving a chip card, the support portion capable of being slidably received in the sliding recess, the extending portion capable of being latched with the positioning frame;
wherein the extending portion comprises an upper surface, a lower surface opposite to the upper surface and facing the positioning frame, and an end surface; the lower surface defines a latching recess; the positioning frame comprises a latching protrusion, the latching protrusion is capable of being latched in the latching recess.

2. The card-loading assembly as claimed in claim 1, wherein the upper surface defines a recessed portion at an end away from the end surface; the support portion comprises a bottom board and two side boards; an end of the bottom board is connected to a bottom of the recessed portion; the two side boards extend substantially perpendicularly from opposite edges of the bottom board; the bottom board, the two side boards, and the bottom of the recessed portion cooperatively define the receiving space.

3. The card-loading assembly as claimed in claim 2, wherein a limiting tab extends from an end of each of the two side boards away from the extending portion.

4. The card-loading assembly as claimed in claim 2, wherein the positioning frame comprises a connecting portion and two guiding arms; the connecting portion includes a bottom plate and two side walls extend along a same direction substantially perpendicularly from opposite edges of the bottom plate; the latching protrusion protrudes from the bottom plate; the two guiding arms extend from edges of the two side walls and are substantially parallel to the bottom plate.

5. A card-loading assembly for loading a chip card in an electronic device, the electronic device comprising a main body, a circuit board received in the main body, and an entrance defined in the main body, the card-loading assembly comprising:
a positioning frame secured on the circuit board, the positioning frame defining a sliding recess; and
a tray comprising a support portion and an extending portion extending from the support portion, the extending portion made of dielectric material, the support portion and the extending portion cooperatively defining a receiving space for receiving the chip card, the tray received in the main body through the entrance, the support portion slidably received in the sliding recess, the extending portion positioned between the circuit board and the entrance;
wherein the extending portion comprises an upper surface, a lower surface opposite to the upper surface and facing the positioning frame, and an end surface, the end surface exposed from the entrance, the lower surface defines a latching recess; the positioning frame comprises a latching protrusion, the latching protrusion is capable of being latched in the latching recess, thereby securing the tray in the main body.

6. The card-loading assembly as claimed in claim 5, wherein the upper surface defines a recessed portion at an end away from the end surface; the support portion comprises a bottom board and two side boards; an end of the bottom board is connected to a bottom of the recessed portion; the two side boards extend substantially perpendicularly from opposite edges of the bottom board; the bottom board, the two side boards, and the bottom of the recessed portion cooperatively define the receiving space.

7. The card-loading assembly as claimed in claim 6, wherein a limiting tab extends from an end of each of the two side boards away from the extending portion.

8. The card-loading assembly as claimed in claim 6, wherein the positioning frame comprises a connecting portion and two guiding arms; the connecting portion includes a bottom plate and two side walls extend along a same direction substantially perpendicularly from opposite edges of the bottom plate; the latching protrusion protrudes from the bottom plate; the two guiding arms extend from edges of the two side walls and are substantially parallel to the bottom plate.

9. An electronic device, comprising:
a main body, the main body defining an entrance;
a circuit board received in the main body;
a chip card; and
a card-loading assembly for loading the chip card in the main body, the card-loading assembly comprising:
a positioning frame secured on the circuit board, the positioning frame and the circuit board cooperatively defining a sliding recess; and
a tray, the tray comprising a support portion and an extending portion extending from the support portion, the extending portion made of dielectric material, the support portion and the extending portion cooperatively defining a receiving space for receiving the chip card, the tray received in the main body through the entrance, the support portion slidably received in the sliding recess, the extending portion positioned between the circuit board and the entrance;

wherein the extending portion comprises an upper surface, a lower surface opposite to the upper surface and facing the positioning frame, and an end surface, the end surface exposed from the entrance, the lower surface defines a latching recess; the positioning frame comprises a latching protrusion, the latching protrusion is capable of being latched in the latching recess, thereby securing the tray in the main body.

10. The electronic device as claimed in claim 9, wherein the upper surface defines a recessed portion at an end away from the end surface; the support portion comprises a bottom board and two side boards; an end of the bottom board is connected to a bottom of the recessed portion; the two side boards extend substantially perpendicularly from opposite edges of the bottom board; the bottom board, the two side boards, and the bottom of the recessed portion cooperatively define the receiving space.

11. The electronic device as claimed in claim 10, wherein a limiting tab extends from an end of each of the two side boards away from the extending portion.

12. The electronic device as claimed in claim 10, wherein the positioning frame comprises a connecting portion and two guiding arms; the connecting portion includes a bottom plate and two side walls extend along a same direction substantially perpendicularly from opposite edges of the bottom plate; the latching protrusion protrudes from the bottom plate; the two guiding arms extend from edges of the two side walls and are substantially parallel to the bottom plate.

13. The electronic device as claimed in claim 12, wherein a corner-edge piece of the circuit is cut off to define a notch and a notch wall; the notch is aligned with the entrance; an electric connector is mounted on the circuit board; the two guiding arms are secured on the circuit board with the electric connector located between the two guiding arms, and the bottom plate of the connecting portion is received in the notch.

14. The electronic device as claimed in claim 13, wherein the bottom board of the support portion defines an opening corresponding to the electric connector.

15. The electronic device as claimed in claim 9, wherein the main body comprises a bottom wall and a peripheral wall; the peripheral wall perpendicularly extends from a periphery of the bottom wall; the bottom wall and the peripheral wall cooperatively defines a mounting space; the circuit board is received in the mounting space; and the entrance is defined in the peripheral wall and communicates with the mounting space.

\* \* \* \* \*